United States Patent

[11] 3,616,017

| [72] | Inventor | Austin L. Tyler<br>Whitehall Township, Lehigh County, Pa. |
|---|---|---|
| [21] | Appl. No. | 725,778 |
| [22] | Filed | May 1, 1968 |
| [45] | Patented | Oct. 26, 1971 |
| [73] | Assignee | Bell Telephone Laboratories, Incorporated<br>Murray Hill, N.J. |

[54] METHOD OF BONDING A LAYER OF INORGANIC MATERIAL TO A THERMOSETTING SILICONE LAYER
9 Claims, 2 Drawing Figs.

| [52] | U.S. Cl. | 156/242,<br>156/244, 156/306, 156/308 |
|---|---|---|
| [51] | Int. Cl. | B29c 19/00 |
| [50] | Field of Search | 156/329,<br>306, 244, 242; 161/206 |

[56] References Cited
UNITED STATES PATENTS

| 3,306,800 | 2/1967 | Plueddemann | 156/329 |
|---|---|---|---|
| 3,437,554 | 4/1969 | Gamble | 156/329 X |

*Primary Examiner*—Benjamin R. Padgett
*Assistant Examiner*—Stephen J. Lechert, Jr.
*Attorneys*—R. J. Guenther and Edwin B. Cave ABSTRACT: Joints between inorganic materials and thermosetting silicone plastics sufficient to withstand thermal cycling are achieved by inserting a layer of two-part room temperature vulcanizing silicone rubber between the materials, thereby allowing the relieving of strains at the joint caused by their differing thermal expansivities.

PATENTED OCT 26 1971                3,616,017

INVENTOR
A. L. TYLER
BY
George S. Cardy
ATTORNEY

METHOD OF BONDING A LAYER OF INORGANIC MATERIAL TO A THERMOSETTING SILICONE LAYER

A satisfactory joint is achieved by allowing the rubber to partially cure on the inorganic material prior to joining so that the elevated temperature required for a subsequent transfer molding operation will not result in the volatilization of critical components.

A preferred embodiment of the bonded product is one in which the inorganic material supports an electronic device, so that molding of the plastic results in encapsulation of the device.

BACKGROUND OF THE INVENTION

1. Field of the Invention

This invention relates to a technique for joining rigid materials having different coefficients of thermal expansion, and also relates to the joined articles so produced. More specifically, it relates to a technique for joining an inorganic material and a molded plastic by means of a silicone rubber.

2. Prior Art

Miniaturization of electronic components and devices has led to a search for new ways to provide them with mechanical and enviromental protection. Their small size and delicacy have led to interest in plastic encapsulants which in turn has led to the necessity of attaining and maintaining intimate contact between a rigid plastic and the substrate, since in addition to the exhibition of structural stability, the joint must exhibit sufficient integrity to prevent development of cracks which will allow the introduction of contaminants from the ambient.

Silicones are generally known to be superior to other known transfer molding compounds due to their stability at elevated temperatures. They are able to withstand prolonged temperatures of around 300° C.

Attempts to join thermo-setting silicone plastics to various substrates have not been successful because of the difference in thermal expansivity of the two materials where that difference is $10 \times 10^{16}$ in./in./° C. or greater. Attempts to promote adhesion by using polyfunctional siloxane coupling agents have also failed because of their inability to absorb the strain caused by the mismatch in coefficients of thermal expansion.

SUMMARY OF THE INVENTION

The present invention is a joining technique which allows the joining of a rigid inorganic material and a thermo-setting silicone plastic by means of inserting between the materials a two-part room temperature vulcanizing silicone rubber whose flexibility relieves the strain introduced at the joint during thermal cycling due to the differing thermal expansivities of the rigid materials.

In order to achieve the joint, rubber is applied to the inorganic material and allowed to partially cure so that the elevated temperature required for a subsequent transfer molding operation will not result in the volatilization of critical components from the rubber. Accordingly, this partial cure, hereinafter referred to as a precure, is to be considered a necessary part of the invention.

The invention includes any bonded article such as a laminate which results from the practice of this technique.

DETAILED DESCRIPTION

Figure 1:
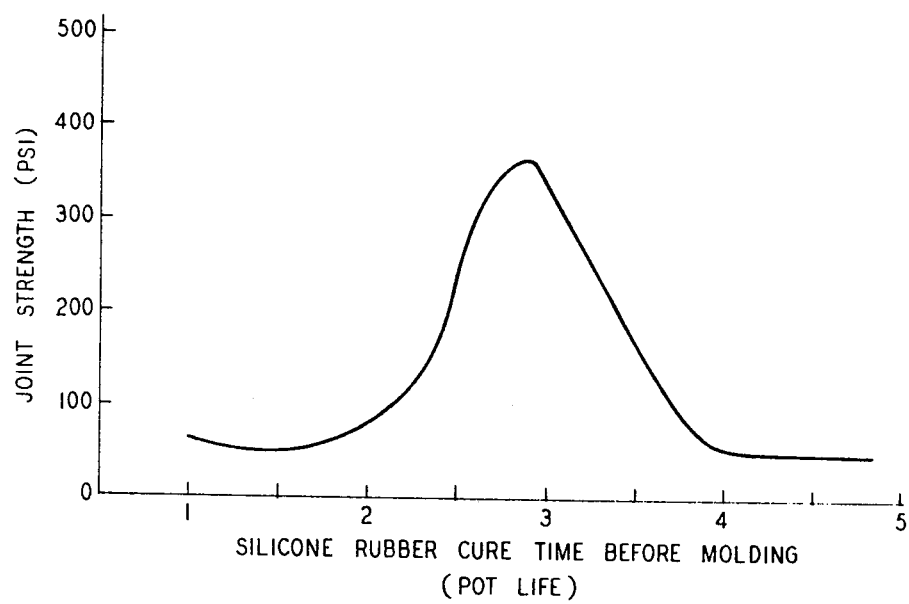
FIG. 1 represents the variation in joint strength of the resultant bonded product with various silicone rubber precure times.

Joints which are suitable for the purpose already stated may be obtained by this technique regardless of the coefficient of thermal expansion mismatch between materials, but the technique is most advantageously practiced where the coefficient of thermal expansion mismatch is $10 \times 10^{16}$ inches per inch per degree C. or greater. Examples of rigid inorganic material include any ceramic, metal or metallized ceramic.

The plastic may be any rigid thermo-setting molded silicone plastic having the following physical properties: A Rockwell M hardness of 10 or greater, Young's modulus of from 0.1 to $5 \times 10^6$ pounds per square inch, and elongation at rupture of 1 percent or less.

A silicone polymer will be understood to include any of a group of semiorganic polymers made up of a skeleton structure of alternating silicon and oxygen atoms with various organic groups attached.

Such thermo-setting molded plastics, commonly referred to as transfer molding compounds, are moldable at from 100° to 350° C. Below this range, the flowability of the plastic is inadequate for conventional molding and above this range the rate at which the material solidifies is too high for conventional molding to be practical.

Successful practice of the invention requires that the layer which is inserted between the rigid materials be a two-part room temperature vulcanizing silicone rubber having the following physical properties: A Durometer Shore A hardness of from 40 to 100 and an elongation at rupture of 50 percent or greater.

It will be understood by those skilled in the art that the curing of a two-part silicone rubber is effected by addition of a curing agent or catalyst before application or other use of the rubber.

The term silicone rubber is intended to encompass both silicone and siloxane polymers having structures which result in the specified physical properties.

Siloxane polymers differ from silicone polymers in that they contain the structural unit $R_2S:O$. R usually contains hydrogen and carbon atoms; however, siloxane polymers may be completely inorganic.

The fact that such rubbers are room temperature vulcanizing of course means that some temperature above room temperature is unnecessary for the complete cure of the rubber.

Prior to application of the rubber to the inorganic material, it is preferred that the surface of the inorganic material to be joined be primed. Such priming is by methods and materials well known in the art, any of which are satisfactory if they result in joint strengths between rubber and inorganic material which are at least as high as the ultimate joint strength desired.

Such priming is typically accomplished by dipping the inorganic material to be primed into a solution containing the primer and subsequently allowing the primer solvent to evaporate. The priming solutions, well known in the art, contain about 1 percent of a bifunctional siloxane molecule dissolved in water or some organic solvent.

The rubber is next applied to the surface within such time after addition of the curing agent or catalyst to the rubber that it retains sufficient fluidity to intimately contact the inorganic surface, preferably without about ⅛ times the pot life. After the rubber is allowed to precure, the plastic is applied to the rubber surface, generally by means of a transfer molding operation. Such molding operations are commonly practiced, and are described in many texts, as for example, "Compression and Transfer Molding of Plastic," Interscience Publishers, Inc., New York, 1959.

The precure is found necessary in the achievement of a satisfactory joint where a subsequent transfer molding operation is carried out at temperatures above 60° C. and generally the degree of precure needed increases with the molding temperature. The upper limit for any transfer molding operation is 350° C., above which chemical changes occur in the rubber, which are detrimental thereto.

For transfer molding compounds presently available, the transfer molding operation is generally carried out at temperatures of from 100° to 300° C. Within this range, optimum results are obtained for a precure which is about three times the pot life. Pot life is roughly defined as the time required after mixing the catalyst or curing agent with the silicone rubber for the material to cease to be fluid. A more exact definition of pot life is given by the following measuring technique. The tip of a 0.25-inch microspatula is depressed below the surface of the mixture and withdrawn. When the string of material attached to the spatula snaps before being withdrawn 1 inch, the end of the pot life has been reached. This measurement is made at 25° C. The rate of cure may be varied with temperature if this is desired, the rate decreasing with decreasing temperature below 25° C. and increasing with increasing temperature above 25° C. At −20° C. the optimum time for precure is about 30 times the pot life at 25° C. or about 10 times as long as the optimum time at 25° C. At 60° C. the optimum time is about 0.3 times the pot life at 25° C. Above 60° C. volatilization of critical components becomes likely, and below −20° C. precure times become commercially inexpedient. If it is preferred to accelerate the precure at temperatures above 25° C., it is preferred that this not be done until about 2 hours after precuring at 25° C.

FIG. 1 graphically depicts the variation in joint strength of the final product with various precure times for a sample prepared in accordance with the example.

As may be seen from FIG. 1, the actual precure time at specified temperatures may vary to about one-half the pot life more or less than the optimum time of 3 times pot life without appreciably affecting the resulting joint. It is generally necessary for achieving optimum results to carry out a postcure, that is, a final cure after formation of the laminate, at an elevated pressure and temperature. A pressure normal to the plane of the surfaces of from 25 to 60 p.s.i. is required to maintain intimate contact between the rubber and the plastic and a temperature of from 100° to 350° C. is required to insure complete cure of the plastic. Complete cure time is defined as the time required to reach one-half of nominal hardness, and for the pressures and temperatures specified, will ordinarily be at least four hours.

EXAMPLE

Samples for testing were produced by applying silicone rubber through a stainless steel screen onto a ceramic disc 0.05 -inch thick by 0.76 inch in diameter to a thickness of about 0.001 inch. The samples were then precured for various times. A disc of silicone transfer molding compound 0.05 - inch thick by 0.5 inch in diameter was then molded onto the treated ceramic disc at a temperature of 160° C. at a pressure of 80 p.s.i. The samples were then postcured at 200° C. for 5 hours with a pressure of 40 to 50 pounds per square inch in a direction normal to the plane of the adhesive joint.

The adhesive joint strength was determined by testing the sample to failure under shear stress. A testing fixture held the ceramic substrate flat while a force parallel to the joined surface was applied to the plastic disc.

Joints which failed reproducibly between 350 and 400 p.s.i. shear were obtained for a precure time of about three times the pot life. In addition, some samples were held for 50 hours at 200° C. and for an additional 16 hours at 300° C. These samples also failed reproducibly between 350 and 400 p.s.i., thus indicating that the joints were not degraded by prolonged exposure to high temperatures.

While the description and example have illustrated the technique to produce a simple laminate of an inorganic and a plastic material, it is to be understood that the technique is not so limited, but applies to any joined product, such as one in which the inorganic material supports an electronic device, so that molding of the plastic results in encapsulation of the device.

Figure 2:
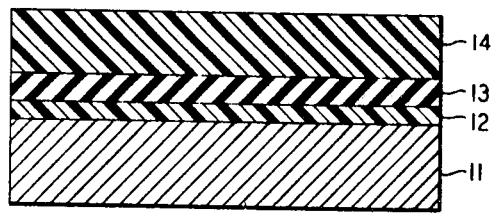
FIG. 2 is a cross section of the resultant bonded product.

Referring now to FIG. 2, there is shown a bonded product prepared in accordance with the inventive technique. Shown in the figure is a substrate 11, having deposited thereon a priming layer 12, and a rubber layer 13. The laminate is completed by the plastic layer 14.

What is claimed is:

1. A method for joining a layer of a rigid inorganic material and a layer of a rigid thermo-setting silicone plastic material, said materials having different coefficients of thermal expansion, comprising adding a catalyst to a room temperature vulcanizing silicone rubber in order to initiate curing of the rubber, applying the rubber to the surface to be joined of the inorganic material, allowing said rubber to partially cure in situ, molding said rigid thermo-setting silicone plastic onto the rubber, and subjecting the resultant product to a temperature of up to 350° C. and a pressure of up to 200 p.s.i. in a direction normal to the joined surfaces for a time of at least 4 hours.

2. The method of claim 1 in which said partial cure is carried out for a time of from two to four times the pot life at a temperature of about 25° C.

3. The method of claim 2 in which the precure is carried out for a time of about three times the pot life.

4. The method of claim 1 in which said molding is carried out at a temperature of from 100° to 350° C.

5. The method of claim 1 in which said inorganic material is a member selected from the group consisting of ceramics, metals and metallized ceramics.

6. The method of claim 1 in which said plastic has a hardness of at least 10 on the Rockwell M scale, Young's modules of from 0.5 to 5 × $10^6$ p.s.i., and elongation at rupture of up to 1 percent.

7. The method of claim 1 in which said rubber has a Durometer Shore A hardness of from 40 to 100 and an elongation at rupture of at least 50 percent.

8. The method of claim 1 in which the surface of the organic material to be joined is primed prior to application of the rubber thereto, said priming being carried out by applying a liquid comprising solvent and the primer and allowing the solvent to evaporate.

9. The method of claim 1 in which the inorganic material supports an electronic device, so that molding of said plastic results in encapsulation of said device.

* * * * *